(12) United States Patent
Erickson et al.

(10) Patent No.: US 7,186,064 B1
(45) Date of Patent: Mar. 6, 2007

(54) ROTARY TAPERED TOOL HOLDER WITH ADAPTER SLEEVE

(75) Inventors: Robert A. Erickson, Raleigh, NC (US); Ted R. Massa, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/300,133

(22) Filed: Dec. 14, 2005

(51) Int. Cl.
*B23C 5/26* (2006.01)

(52) U.S. Cl. ............... 409/234; 409/232; 279/103; 408/239 A; 408/239 R (58) Field of Classification Search .......... 409/234, 409/231–233; 279/102–103, 46.3–46.6, 279/46.8; 408/239 R, 239 A
See application file for complete search history.

(56) References Cited

U.S. PATENT DOCUMENTS

| | | | |
|---|---|---|---|
| 4,643,623 A | 2/1987 | Kondo et al. | |
| 4,714,389 A | 12/1987 | Johne | |
| 4,808,049 A | 2/1989 | Cook | |
| 4,840,520 A | 6/1989 | Pfalzgraf | |
| 4,850,765 A | 7/1989 | Ramunas | |
| 4,886,402 A | 12/1989 | Pfalzgraf | |
| 4,939,834 A | 7/1990 | Kawasaki et al. | |
| 5,030,047 A | 7/1991 | Pfalzgraf | |
| 5,110,240 A | 5/1992 | Zeilinger et al. | |
| 5,114,286 A | 5/1992 | Calkins | |
| 5,201,621 A | 4/1993 | McMurtry et al. | |
| 5,311,654 A | 5/1994 | Cook | |
| 5,593,258 A | 1/1997 | Matsumoto et al. | |
| 5,716,173 A | 2/1998 | Matsumoto | |
| 5,775,857 A | 7/1998 | Johne | |
| 5,873,687 A | 2/1999 | Watanabe | |
| 5,964,556 A | 10/1999 | Toyomoto | |
| 5,971,681 A | 10/1999 | Wolfe et al. | |
| 6,077,003 A | 6/2000 | Laube | |
| 6,224,303 B1 | 5/2001 | Wheeler et al. | |
| 6,224,306 B1 | 5/2001 | Hiroumi et al. | |
| 6,352,395 B1 | 3/2002 | Matsumoto et al. | |
| 6,394,466 B1 | 5/2002 | Matsumoto et al. | |
| 6,425,716 B1 | 7/2002 | Cook | |
| 6,599,068 B1 * | 7/2003 | Miyazawa | 409/234 |
| 6,739,810 B2 | 5/2004 | Komine | |
| 2003/0103828 A1 * | 6/2003 | Kitaura | 409/234 |

(Continued)

FOREIGN PATENT DOCUMENTS

JP 7-276168 A 10/1995

(Continued)

*Primary Examiner*—Erica Cadugan
(74) *Attorney, Agent, or Firm*—Larry R. Meenan (57) ABSTRACT

A rotary tapered tool holder includes a body or shank including a front contact portion and a rear contact portion. An adapter sleeve is disposed about a portion of the shank. The adapter sleeve includes slits that allow radial expansion and contraction of the adapter sleeve. The adapter sleeve includes an inner surface formed at a first non-zero taper angle with respect to a longitudinal axis of the shank, and an outer surface formed at a second non-zero taper angle with respect to the longitudinal axis of the shank. The second taper angle is different than the first taper angle such that an interference fit between the shank and the inner surface of the adapter sleeve forces the outer surface of the adapter sleeve into positive contact with a tapered bore of a spindle of the rotary tapered tool holder.

20 Claims, 7 Drawing Sheets

U.S. PATENT DOCUMENTS

2005/0158135 A1* 7/2005 Massa et al. ............... 409/234

FOREIGN PATENT DOCUMENTS

| JP | 7-299614 | | 11/1995 |
| JP | 09038837 A | | 2/1997 |
| JP | 2000-158269 A | * | 6/2000 |
| JP | 2000-158270 A | * | 6/2000 |
| JP | 2001-232503 A | * | 8/2001 |
| JP | 2001310228 A1 | | 11/2001 |
| JP | 2002103112 A | | 4/2002 |
| JP | 2002-346865 A | * | 12/2002 |

* cited by examiner

ROTARY TAPERED TOOL HOLDER WITH ADAPTER SLEEVE

BACKGROUND OF THE INVENTION

Rotary tapered tool holders, commonly referred to as "steep taper" tool holders, are well known in the art. Steep taper tool holders have a male tapered portion extending from a V-flange portion. The V-flange portion has a V-shaped groove to assist the machine tool changer mechanism in gripping the tool. One of the most common steep taper tool holder designs is the Caterpillar V-flange tool holder, generally referred to as a "CV" tool holder. CV tool holders are one of several standards for very similar tool holder designs, all of which have 7/24 tapers (7 inches of diameter change per 24 inches of length). Another common 7/24 tapered tool holder standard is the "BT" tool holder.

The tapered shank portion of the steep taper tool holder is held in a corresponding female tapered portion of a spindle. The tool holder is held in and rotated at high speeds by the spindle. There are generally two types of steep taper tool holders: (1) taper-only contact tool holders, in which only the tapered surface of the tool holder contacts the tapered inside surface of the spindle; and (2) face-taper contact tool holders, wherein the face of the tool holder flange is in contact with the face of the spindle in addition to surface contact between the tapered portion of the tool holder and the spindle. The face-taper contact type tool holder can require a specially designed spindle, wherein the mating face of the spindle is machined more precisely to facilitate operating in contact with the face of the tool holder V-flange portion.

Conventional steep taper tool holders of both types can suffer from certain problems. For example, in a standard steep taper tool holder the taper tolerances for tool holder taper and spindle taper produce a situation wherein the adjacent tapers are in hard contact at the front, but may be out of contact at the rear. When the tool holder is rotated, this divergence of taper angles can produce 'rocking' of the tool holder with resulting loss of accuracy and balance. As the spindle is rotated at high speeds, both the spindle taper diameter and the tool holder taper diameter increase under the influence of centrifugal force. However, the spindle taper diameter increases faster than the tool holder taper diameter. Moreover, the diametrical increase is typically not uniform along the length of the spindle taper, but is greatest at the front of the taper. As a result, the spindle taper angle changes, and the tapered surface can even become convex. If the spindle taper were to expand uniformly (maintain the same taper angle), then good fit between spindle and tool holder could be maintained at high speeds via the tool moving axially into the spindle. Unfortunately, because the spindle taper angle changes, the fit between tool holder and spindle degrades at high speeds. The result is two-fold for the standard tool holder. First, since the overall spindle taper diameter increases faster than the tool holder taper diameter, and there is no face contact, the tool holder is drawn into to the spindle (moves axially). Second, because of the taper angle change, the primary contact, which is initially at the front of the taper, moves to the middle or rear of the taper, which results in increased 'rocking' of the tool holder in the spindle. The tool holder taper also increases in diameter and changes angle at high speeds, but the amount of change is very small compared to the spindle because the mean diameters of the tool holder are much smaller.

There are also disadvantages encountered with prior art face-taper contact steep taper tool holders. For example, 'rocking' can be greatly reduced. However, as the tool holder is rotated at high speeds, the spindle taper diameter still increases faster than the tool holder taper diameter, although axial positioning is maintained due to the face contact. But, since the tool holder cannot be drawn into the spindle, a radial gap is produced between the tapers, which allows radial motion of the tool holder and results in loss of accuracy and balance.

Another prior art type face-taper contact tool holder uses a tapered sleeve on a shank which moves axially as the rotational speed increases so that the tool holder stays in contact with the spindle. The moveable sleeve can ease tolerancing requirements, but as the tool holder is rotated at high speeds the sleeve moves axially to stay in contact with the spindle. However, the sleeve also increases in diameter due to the centrifugal forces. Therefore, even though the sleeve maintains contact with the spindle, the sleeve can lose contact with the tool holder shank, resulting in a radial gap, thus resulting in unbalance and loss of accuracy.

Another prior art type face-taper contact tool holder uses a sleeve which is split such that it can flex circumferentially and therefore change diameter. The sleeve can thus stay in simultaneous contact with the tool holder shank and the spindle taper as the spindle taper diameter in changing. However, the sleeve still cannot adapt to the changing taper angle, such that contact is still localized at either the front or rear of the taper. Also, friction limits the ability of the sleeve to always maintain solid contact between tool holder and taper, and some 'slop' is bound to exist, reducing tool holder stiffness. The split sleeve can also be prone to contamination problems since any material that is present between the sleeve and the tool holder shank will reduce the design's effectiveness, and sealing can be impractical.

Each of the prior art tool holder designs described above, generally in the order listed, can provide an incremental improvement over the previous designs. However, each can also have corresponding increases in mechanical complexity, and all require a face contact to operate. Moreover, although each appear to be effective when at rest, they each have varying limitations at high speeds. In addition, the tight tolerances on the gage diameter is difficult to manufacture and the steep taper angle is not suited for face-taper contact. The spring loaded collets do not provide proper interface forces in the tool holder, thereby limiting rigidity.

Therefore, the prior art face-taper contact tool holders can provide an improvement over the standard tool holder, but they can also have varying limitations at high speeds, increased in mechanical complexity, and all require face contact.

Accordingly, there is a need for an improved steep taper tool holder which can overcome the limitations of the known steep taper tool holders, and reduce or eliminate taper related accuracy and balance problems.

BRIEF SUMMARY OF THE INVENTION

To solve these and other problems associated with conventional steep taper tool holders, the inventors of the present invention have developed a rotary tapered tool holder comprising a shank including a front contact portion; and an adapter sleeve disposed about a portion of the shank. The adapter sleeve includes an inner surface formed at a first non-zero taper angle with respect to a longitudinal axis of the shank, and an outer surface formed at a second non-zero taper angle with respect to the longitudinal axis of the shank. The second taper angle is different than the first taper angle such that an interference fit between the shank and the inner surface of the adapter sleeve forces the outer surface of the adapter sleeve into positive contact with a tapered bore of a spindle of the rotary tapered tool holder.

In another aspect of the invention, a rotary tapered tool holder comprises a body including a front contact portion and a rear contact portion; and an adapter sleeve disposed about the front and rear contact portions of the body. The sleeve includes an inner surface formed at a first non-zero taper angle with respect to a longitudinal axis of the body, and an outer surface formed at a second non-zero taper angle with respect to the longitudinal axis of the body. The second taper angle is different than the first taper angle such that an interference fit between the front and rear contact portions of the body and the inner surface of the adapter sleeve forces the outer surface of the adapter sleeve into positive contact with a tapered bore of a spindle of the rotary tapered tool holder.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
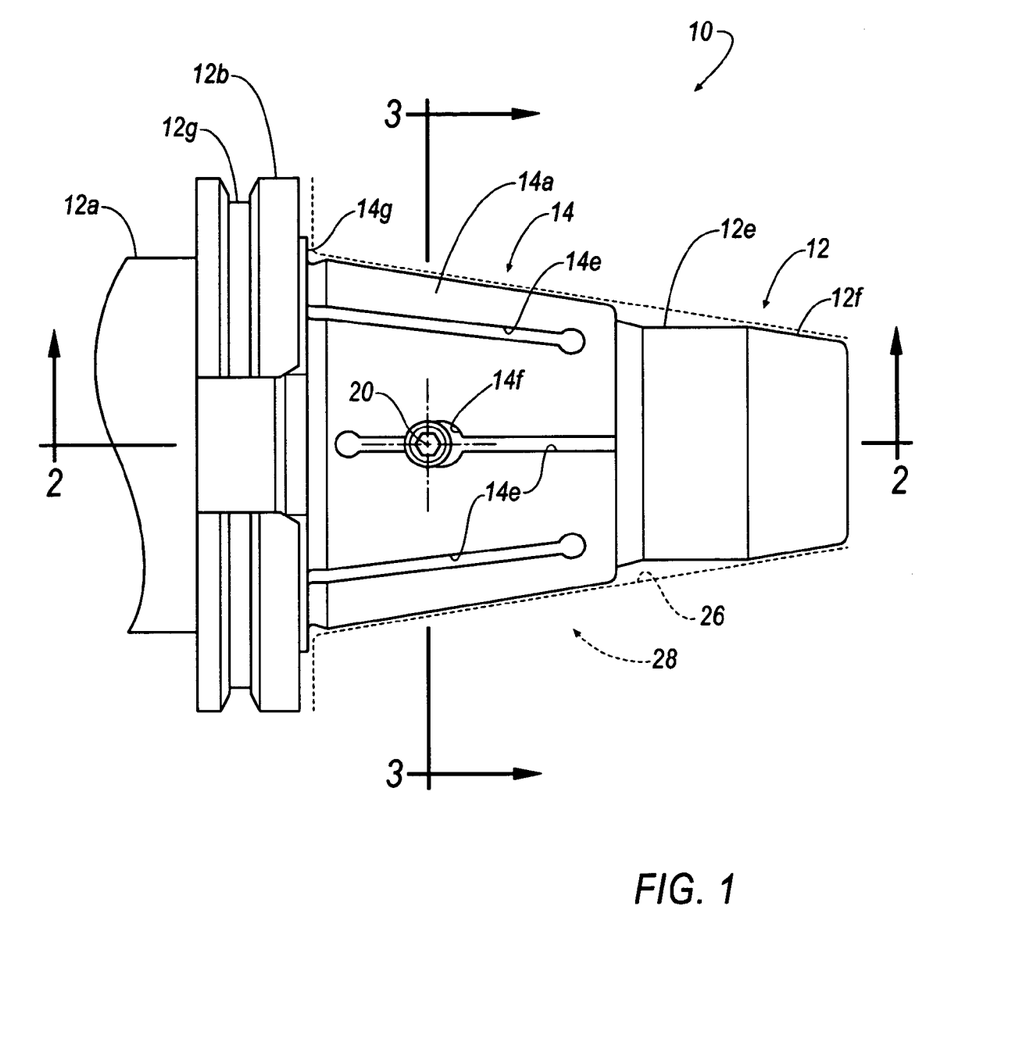
FIG. 1 is a side view of a rotary tapered tool holder with an adapter sleeve according to an embodiment of the invention.

Referring now to FIGS. 1–4, there is shown an embodiment of a rotary, steep taper tool holder, shown generally at 10, for detachably retaining a rotary tool in a tapered bore 26 of a spindle 28 (shown in phantom in FIG. 1). In general, the rotary tapered tool holder 10 comprises a shank or body 12 and an adapter sleeve 14 that may be in the form of a collet that is disposed about a portion of the body 12.

Figure 2:
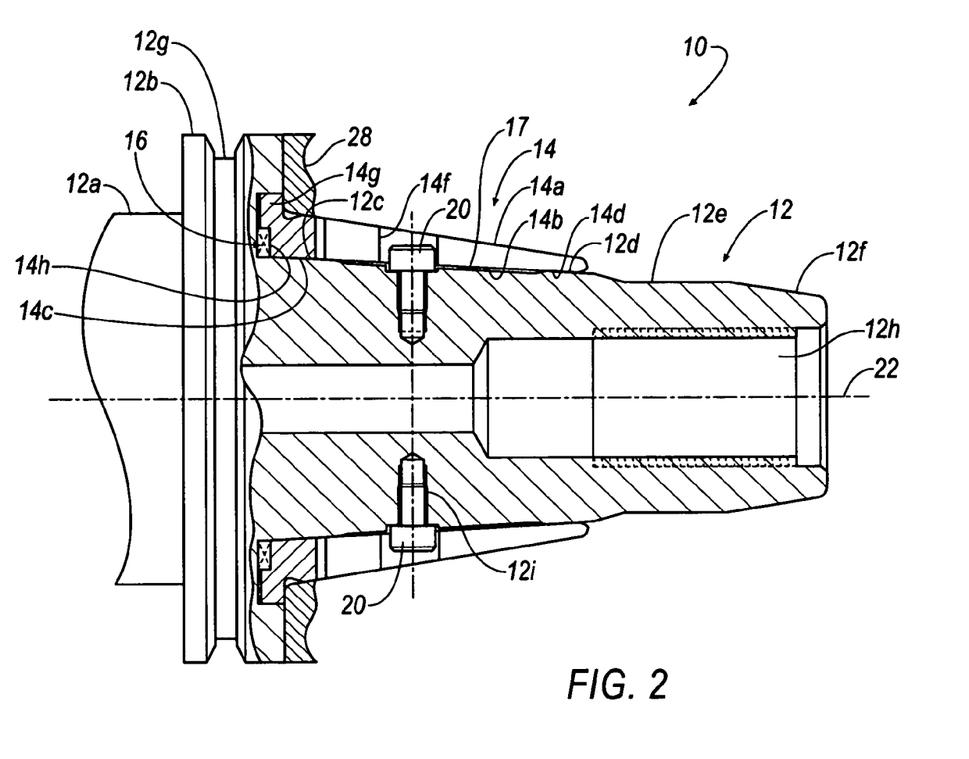
FIG. 2 is a cross-sectional view of the rotary tapered tool holder taken along line 2—2 of FIG. 1.
Figure 3:
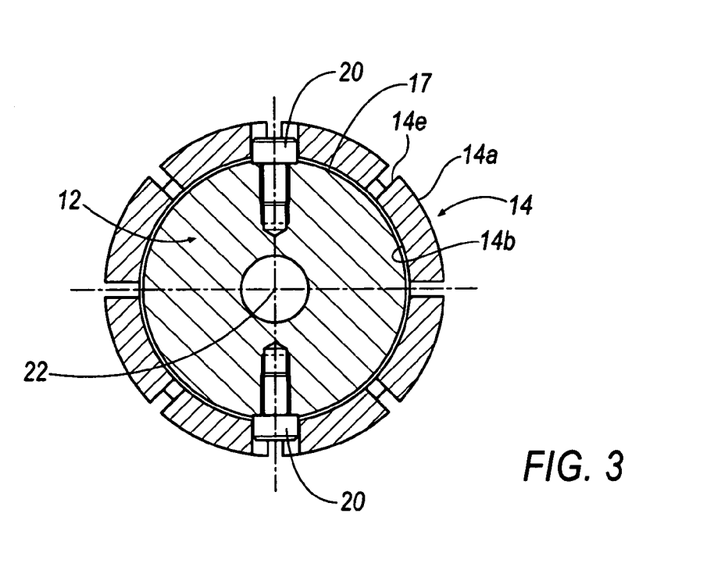
FIG. 3 is a cross-sectional view of the rotary tapered tool holder taken along line 3—3 of FIG. 1.
Figure 4:
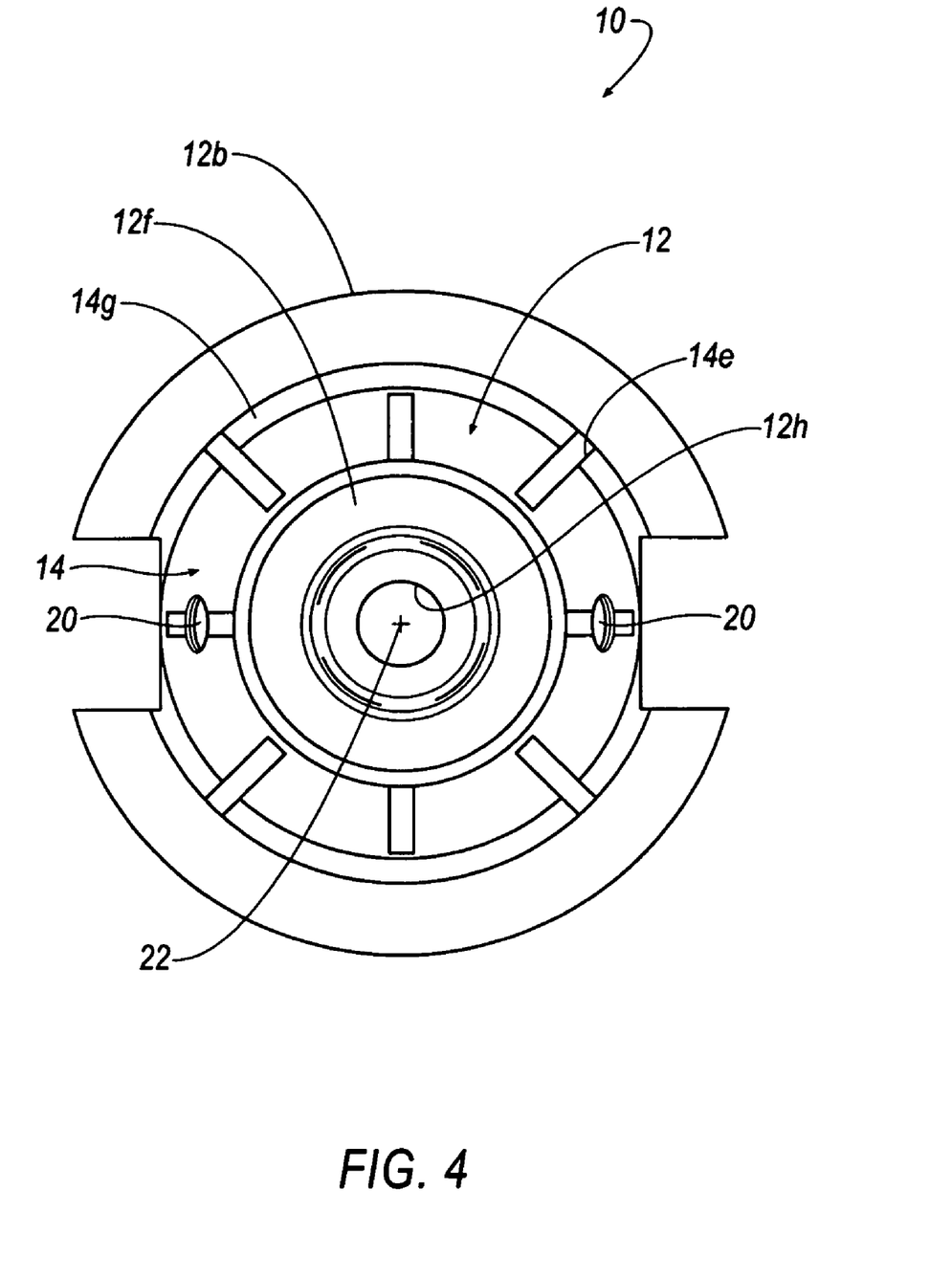
FIG. 4 is an end view of the rotary tapered tool holder of FIG. 1 as viewed from the rear of the tool holder.

The shank or body 12 includes a tool holder portion 12a, a flange member 12b, a front contact portion 12c, a rear contact portion 12d, a reduced diameter outer surface 12e, and a tapered outer surface 12f that generally corresponds to the taper angle of the tapered bore 26 of the spindle 28. A V-shaped notch 12g may be formed around the periphery of the flange member 12b. Alternatively, the V-shaped notch 12g may be omitted. One or more bores 12i are formed between the front and rear contact portions 12c, 12d and extend radially with respect to a central bore 12h of the body 12. The bores 12i may be provided with threads. In the illustrated embodiment, two bores 12i are formed at an angle of approximately 180° with respect to each other, as shown in FIGS. 2 and 3. The purpose of the bores 12i is to accommodate a retention pin or screw 20 which limits movement of the adapter sleeve 14 along a longitudinal axis 22 of the body 12. Thus, the retention screws 20 act as a stop for the adapter sleeve 14. It will be appreciated that the invention can be practiced with a greater number of bores 12i and retention screws 20, if needed. A rear portion of the central bore 12h of the body 12 may be threaded to accommodate a retention knob adapter (not shown) of a type well-known in the art that is capable of threadingly engaging a retention knob (not shown) to apply a force along the longitudinal axis 22 to secure the tool holder 10 in the spindle 28.

The adapter sleeve 14 is substantially annular and includes a tapered outer surface 14a designed to provide face contact with the tapered bore 26 of the spindle 28. The adapter sleeve 14 also includes an inner surface 14b with a front contact portion 14c designed to provide selective engagement with the front contact portion 12c of the body 12, and a rear contact portion 14d designed to provide selective engagement with the rear contact portion 12d of the body 12. As shown in FIG. 2, a gap 17 may exist between the adapter sleeve 14 and the body 12 such that only the front and rear contact portions 14c, 14d of the adapter sleeve 14 contact the front and rear contact portions 12c, 12d of the body 12, respectively, when the tool holder 10 is assembled. However, it will be appreciated that the invention can be practiced without the gap 17 and that the invention can be practiced with continuous contact between the body 12 and the adapter sleeve 14.

The adapter sleeve 14 also includes a plurality of longitudinally extending slots or slits 14e (FIG. 1) to provide additional flexibility to the adapter sleeve 14 such that the adapter sleeve 14 can expand and/or contract in the radial direction in a controlled manner. When the adapter sleeve 14 is in a relaxed state, the front contact portion 14c and the rear contact portion 14d are slightly larger in diameter than the front contact portion 12c and the rear contact portion 12d of the body 12 such that the adapter sleeve 14 can be loosely fit over the body 12. However, when a force in the axial direction is applied to the adapter sleeve 14, the slits 14e allow the adapter sleeve 14 to flex circumferentially and allow the adapter sleeve 14 to enter the tapered bore 26 of the spindle 28 and "adapt" to the taper angle of the tapered bore 26 such that the front and rear contact portions 14c, 14d of the adapter sleeve 14 contact the front and rear contact portions 12c, 12d of the body 12, respectively, thereby providing an interference fit between the adapter sleeve 14 and the tapered bore 26 of the spindle 28. As a result, the tool holder 10 of the invention can achieve a higher rotational speed as compared to conventional tool holders.

In the illustrated embodiment, the slits 14e extend in an alternating arrangement such that one slit 14e extends from the rear of the adapter sleeve 14 toward the front, while an adjacent slit 14e extends from the front of the adapter sleeve 14 toward the rear. In the illustrated embodiment, the adapter sleeve 14 has a total of eight (8) slits 14e that are spaced equidistant from each other (i.e., approximately forty-five (45) degrees apart). In addition, the one or more slits 14e may include a substantially circular aperture 14f that is designed to allow the retention screw 20 to pass therethrough. In the illustrated embodiment, the adapter sleeve 14 includes two (2) apertures 14*f* that are approximately 180° apart from each other to accommodate two retention screws 20.

As seen in FIG. 2, the front of the adapter sleeve 14 includes a flange 14*g* that abuts the spindle 28 when the adapter sleeve 14 is properly disposed about a portion of the body 12 and prevents excessive movement of the adapter sleeve 14 toward the rear of the spindle 28 (i.e., along the longitudinal axis 22). A notch 14*h* may be formed in the flange 14*g* to accommodate a means for biasing the adapter sleeve 14, such as a compression spring, a wave spring, and the like. The biasing means 16 exerts a force against the adapter sleeve 14 in the direction away from the front of the adapter sleeve 14 and toward the rear (i.e., along the longitudinal axis 22 of the body 12). The retention screw 20 prevents excessive movement of the adapter sleeve 14 when the adapter sleeve 14 is biased by the biasing means 16. The amount of movement of the adapter sleeve 14 can be selectively adjusted by varying the dimension of the aperture 14*f*, as shown in FIG. 1.

Figure 5:
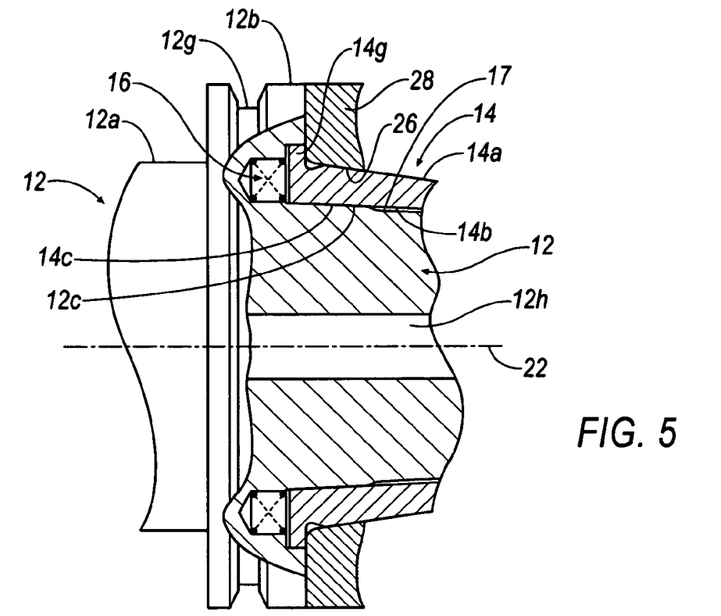
FIGS. 5 and 6 are cutaway cross-sectional views of alternative spring designs using compression springs in the rotary tapered tool holder according to an alternate embodiment of the invention.
Figure 6:
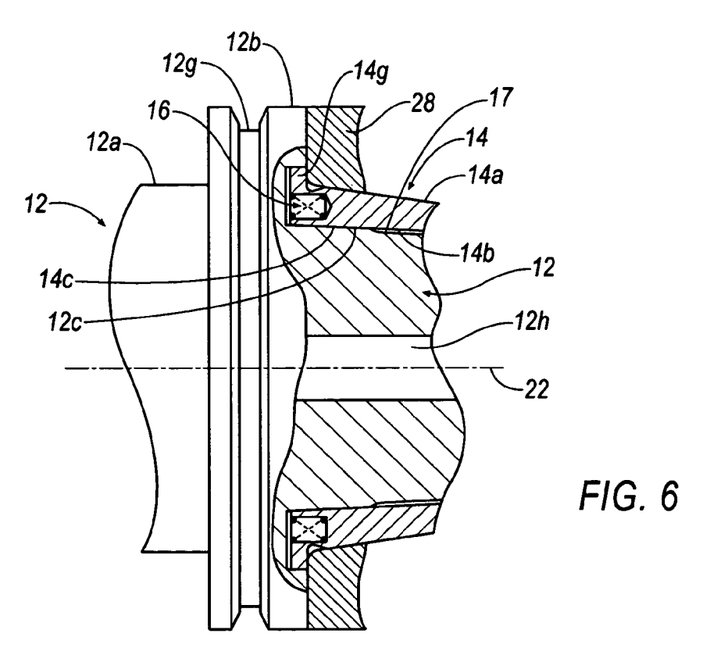
Figure 7:
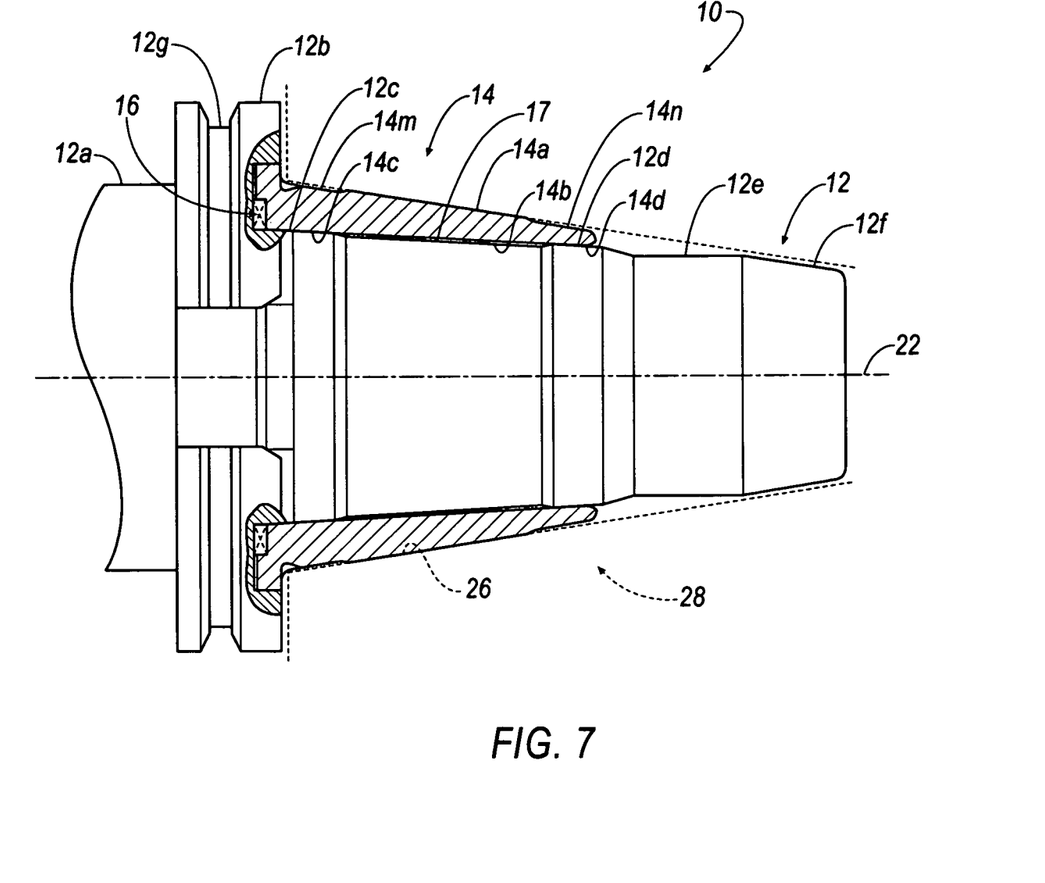
FIG. 7 is a cross-sectional view of an alternative rotary tapered tool holder with a flexible adapter sleeve for controlling an amount of force to overcome the interference as well as allow for greater interferences levels (allows higher rotational speeds) according to an embodiment of the invention.

The invention can be practiced with any desirable arrangement for the biasing means 16. For example, the biasing means 16 can comprise one or more compression springs 16 that is entirely positioned in front of the adapter sleeve 14, as shown in FIG. 5. In another example, the compression spring(s) 16 may be positioned in the notch 14*h* of the adapter sleeve 14, as shown in FIG. 6. It will be appreciated that other arrangement are within the scope of the invention. For example, the biasing means 16 may comprise a wave spring 16 disposed in the notch 14*h* of the adapter sleeve 14, as shown in FIG. 7. In the embodiment of FIG. 7, the outer surface 14*b* of the adapter sleeve 14 also includes a front relief portion 14*m* and a rear relief portion 14*n* that overlie a portion of the gap 17 between the adapter sleeve 14 and the body 12. The front and rear relief portions 14*m*, 14*n* allow the flexibility to the adapter sleeve 14 to be selectively adjusted such that the adapter sleeve 14 can "adapt" and provide a selectively adjustable amount of interference between the body 12 and the adapter sleeve 14.

As mentioned earlier, the flange 14*g* that abuts the face of the tapered bore 26 to prevent axial movement of the adapter sleeve 14 when the outer surface 14*b* of the adapter sleeve 14 is forced into positive contact with the tapered bore 26 of the spindle 28 of the rotary tapered tool holder 10. Prior to the flange 14*g* abutting the face of the tapered bore 26, the adapter sleeve 14 contracts in the radial direction as a force in the axial direction is applied to the adapter sleeve 14.

One aspect of the invention is that the outer surface 14*a* of the adapter sleeve 14 has a non-zero taper angle of approximately 7:24, whereas the inner surface 14*b* of the adapter sleeve 14 has a different non-zero taper angle, for example, a relatively smaller non-zero taper angle of approximately 1:10 with respect to the longitudinal axis 22 of the body 12. This difference between the non-zero taper angle of the outer surface 14*a* and the non-zero taper angle of the inner surface 14*b* causes the adapter sleeve 14 to "adapt" and provide an interference fit between the 1:10 taper angle of the inner surface 14*b* of the adapter sleeve 14 and the front and rear contact portions 12*c*, 12*d* of the body 12. This interference fit forces the outer surface 14*a* of the adapter sleeve 14 into positive contact with the tapered bore 26 of the spindle 28 of the tool holder 10 when an axial force is applied to the tool holder 10.

Figure 8:
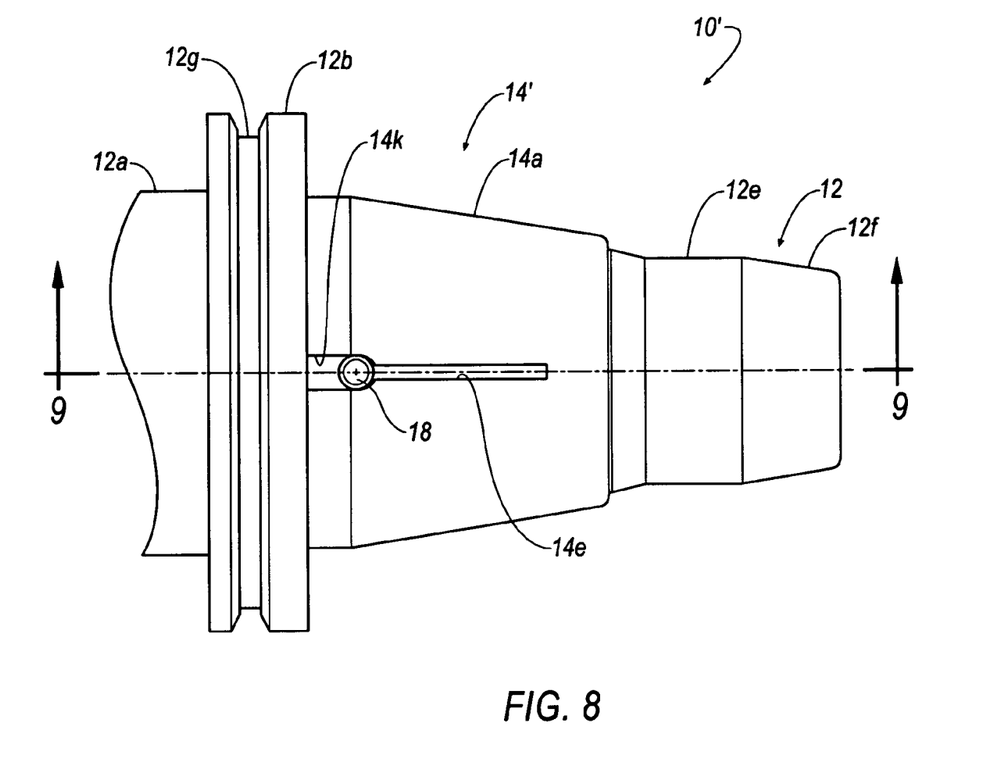
FIG. 8 is a side view of a rotary tapered tool holder with adapter sleeve and stop pins according to an alternate embodiment of the invention.
Figure 9:
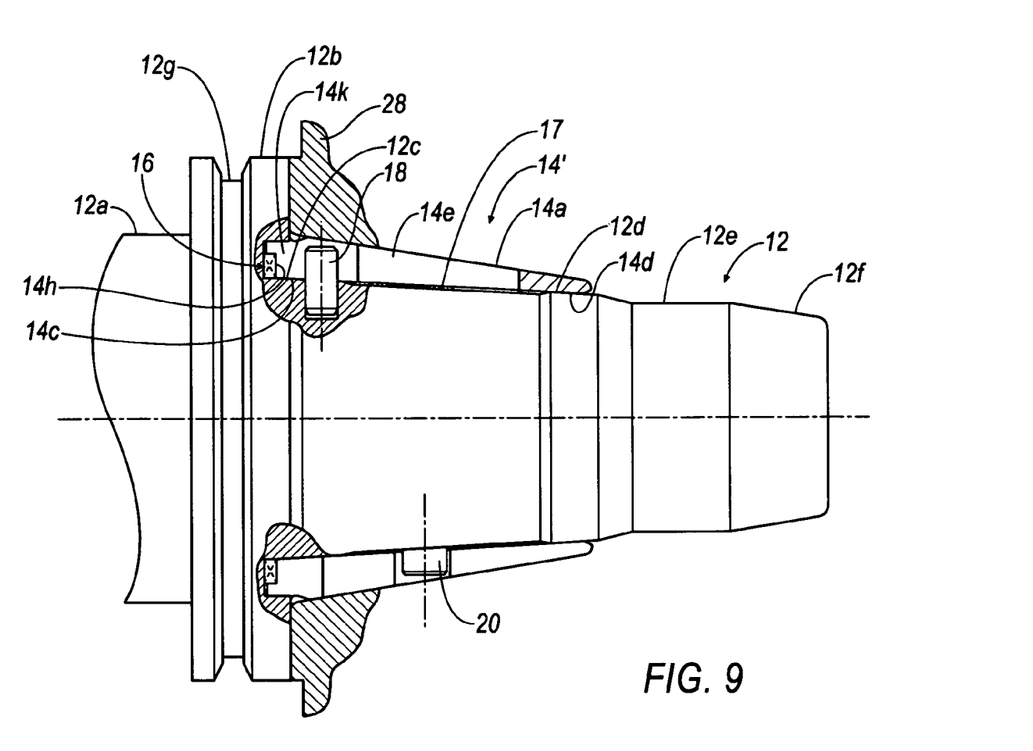
FIG. 9 is a cross-sectional view of the rotary tapered tool holder taken along line 9—9 of FIG. 8.
Figure 10:
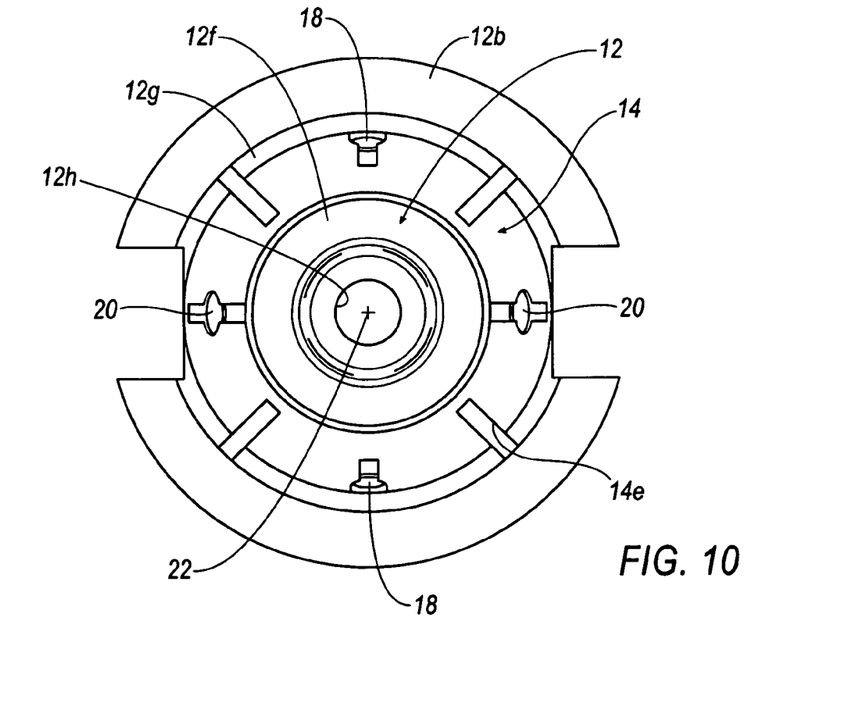
FIG. 10 is an end view of the rotary tapered tool holder of FIG. 8 as viewed from the rear of the tool holder.

Referring now to FIGS. 8–10, a tool holder 10' is shown according to an alternate embodiment. In general, the tool holder 10' is substantially similar to the tool holder 10, except that the flange 14*g* of the adapter sleeve 14 is not necessary in the tool holder 10'. Instead of the flange 14*g*, the tool holder 10' includes one or more radial stop pins 18 disposed in the front contact portion 12*c* of the body 12 and through an aperture 14*k* formed in the front contact portion 14*c* of the adapter sleeve 14', as shown in FIG. 9. The radial stop pins 18 perform substantially the same function as the flange 14*g* by preventing excessive axial movement of the adapter sleeve 14' when inserted into the spindle 28. The radial stop pins 18 provide the function of selectively limiting an amount of radial contraction of the adapter sleeve 14'. The amount of radial contraction can be selectively adjusted by varying the diameter of the radial stop pin 18 with respect to the width of the aperture or slot 14*k* in the flangeless design of the tool holder 10'. It will be appreciated that it is not necessary that the radial stop pins 18 be at least partially disposed in the body 12 to selectively adjust the amount of radial contraction of the adapter sleeve 14', and that the invention can be practiced in which the radial stop pins 18 are entirely disposed within the adapter sleeve 14'.

In the illustrated embodiment, two radial stop pins 18 are positioned approximately 180° apart from each other, and approximately 90° apart from the retention screws 20. Thus, the tool holder 10' includes two radial stop pin 18 and two retention screws 20 that are approximately 90° apart from each other. However, it will be appreciated that the invention is not limited by the number and spacing of the stop pins 18 and the retention screws 20 and that other configurations are within the scope of the invention. In addition, the radial stop pins 18 can be disposed within the body 12 of the tool holder 10' in any desirable manner, such as by press fitted, threaded, and the like. Alternatively, the radial stop pins 18 can be entirely disposed in the adapter sleeve 14'.

As described above, the tool holder 10 of the invention includes a adapter sleeve 14 that can "adapt" to a taper angle that is suitable for face/taper contact tooling. In the illustrated embodiment, the taper angle is approximately 1:10. The concept of the invention is accomplished with the use of the adapter sleeve 14, 14' that is forced into the tapered bore 26 of the spindle 28 of the rotary tapered tool holder 10 in spring-loaded fashion. The adapter sleeve 14 is then located in a fixed axial position by the flange 14*g* that abuts the face of the spindle 28 in the tool holder 10. Alternatively, the adapter sleeve 14' can be located in a fixed axial position by radial stop pins 18 in the flangeless design of the tool holder 10'. Once the adapter sleeve 14, 14' is in its final axial position, the central part of the tool holder 10, 10' is drawn into face contact. At the face contact position, an interference fit situation exists between the 1:10 taper angle of the central portion of the body 12 of the tool holder 10, 10' and the inner surface 14*a* of the adapter sleeve 14, 14'. The interference fit situation forces the outer surface 14*b* of the adapter sleeve 14, 14' into positive contact with the tapered bore 26 of the spindle 28 of the rotary tapered tool holder 10, 10'. The adapter sleeve 14, 14' is manufactured with dimensions that provide a slight clearance between the inner surface 14*a* of the adapter sleeve 14, 14' and the outer diameter of the central portion of the body 12 of the toolholder 10, 10'. This slight clearance allows for a loose fit between the body 12 and the adapter sleeve 14, 14' in the released state.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A rotary tapered tool holder, comprising:
a shank including a front contact portion; and
an adapter sleeve disposed about a portion of the shank, the adapter sleeve including an inner surface formed at a first non-zero taper angle with respect to a longitudinal axis of the shank and an outer surface formed at a second non-zero taper angle with respect to the longitudinal axis of the shank, the second non-zero taper angle being different than the first non-zero taper angle such that an interference fit between the shank and the inner surface of the adapter sleeve forces the outer surface of the adapter sleeve into positive contact with a tapered bore of a spindle of the rotary tapered tool holder, the adapter sleeve having at least one slit having an aperture receiving at least one of a pin or screw.

2. The rotary tapered tool holder of claim 1, wherein the first non-zero taper angle is smaller than the second taper angle.

3. The rotary tapered tool holder of claim 2, wherein the first non-zero taper angle is approximately equal to 1:10, and wherein the second non-zero taper angle is approximately 7:24.

4. The rotary tapered tool holder of claim 1, wherein the at least one slit having an aperture includes two slits having apertures.

5. The rotary tapered tool holder of claim 1, further comprising means for biasing the adapter sleeve against the tapered bore of the spindle.

6. The rotary tapered tool holder of claim 5, wherein the biasing means comprises a spring.

7. The rotary tapered tool holder of claim 1, wherein the at least one pin or screw is received in the shank.

8. The rotary tapered tool holder of claim 1, wherein the at least one pin or screw includes at least one radial stop pin for limiting an amount of contraction of the adapter sleeve when the outer surface of the adapter sleeve is forced into positive contact with the tapered bore of the spindle of the rotary tapered tool holder.

9. The rotary tapered tool holder of claim 1, wherein the adapter sleeve further comprises a flange that abuts a face of the spindle to prevent axial movement of the adapter sleeve when the outer surface of the adapter sleeve is forced into positive contact with the tapered bore of the spindle of the rotary tapered tool holder.

10. The rotary tapered tool holder of claim 1, wherein the adapter sleeve further comprises a front relief portion and a rear relief portion that overlap a gap between the adapter sleeve and the shank.

11. A rotary tapered tool holder, comprising:
a body including a front contact portion and a rear contact portion;
an adapter sleeve disposed about the front and rear contact portions of the body, the sleeve including an inner surface formed at a first non-zero taper angle with respect to a longitudinal axis of the body and an outer surface formed at a second non-zero taper angle with respect to the longitudinal axis of the body, the second non-zero taper angle being different than the first non-zero taper angle such that an interference fit between the front and rear contact portions of the body and the inner surface of the adapter sleeve forces the outer surface of the adapter sleeve into positive contact with a tapered bore of a spindle of the rotary tapered tool holder, the adapter sleeve having at least one slot having an aperture receiving at least one of a pin or screw.

12. The rotary tapered tool holder of claim 11, wherein the first non-zero taper angle is smaller than the second non-zero taper angle.

13. The rotary tapered tool holder of claim 12, wherein the first non-zero taper angle is approximately equal to 1:10, and wherein the second non-zero taper angle is approximately equal to 7:24.

14. The rotary tapered tool holder of claim 11, wherein the at least one slot having an aperture for receiving a retention pin or screw includes two slots having apertures.

15. The rotary tapered tool holder of claim 11, further comprising means for biasing the adapter sleeve against the tapered bore of the spindle.

16. The rotary tapered tool holder of claim 15, wherein the biasing means comprises a spring.

17. The rotary tapered tool holder of claim 11, wherein the at least one pin or screw includes a radial stop pin for limiting an amount of contraction of the adapter sleeve when a force is applied to the tool holder.

18. The rotary tapered tool holder of claim 17, wherein the at least one radial stop pin is at least partially disposed in the body.

19. The rotary tapered tool holder of claim 11, wherein the adapter sleeve further comprises a flange that interacts with a face of the spindle to prevent axial movement of the adapter sleeve.

20. The rotary tapered tool holder of claim 11, wherein the adapter sleeve further comprises a front relief portion and a rear relief portion that overlap a gap between the adapter sleeve and the body.

* * * * *